United States Patent Office 3,564,040
Patented Feb. 16, 1971

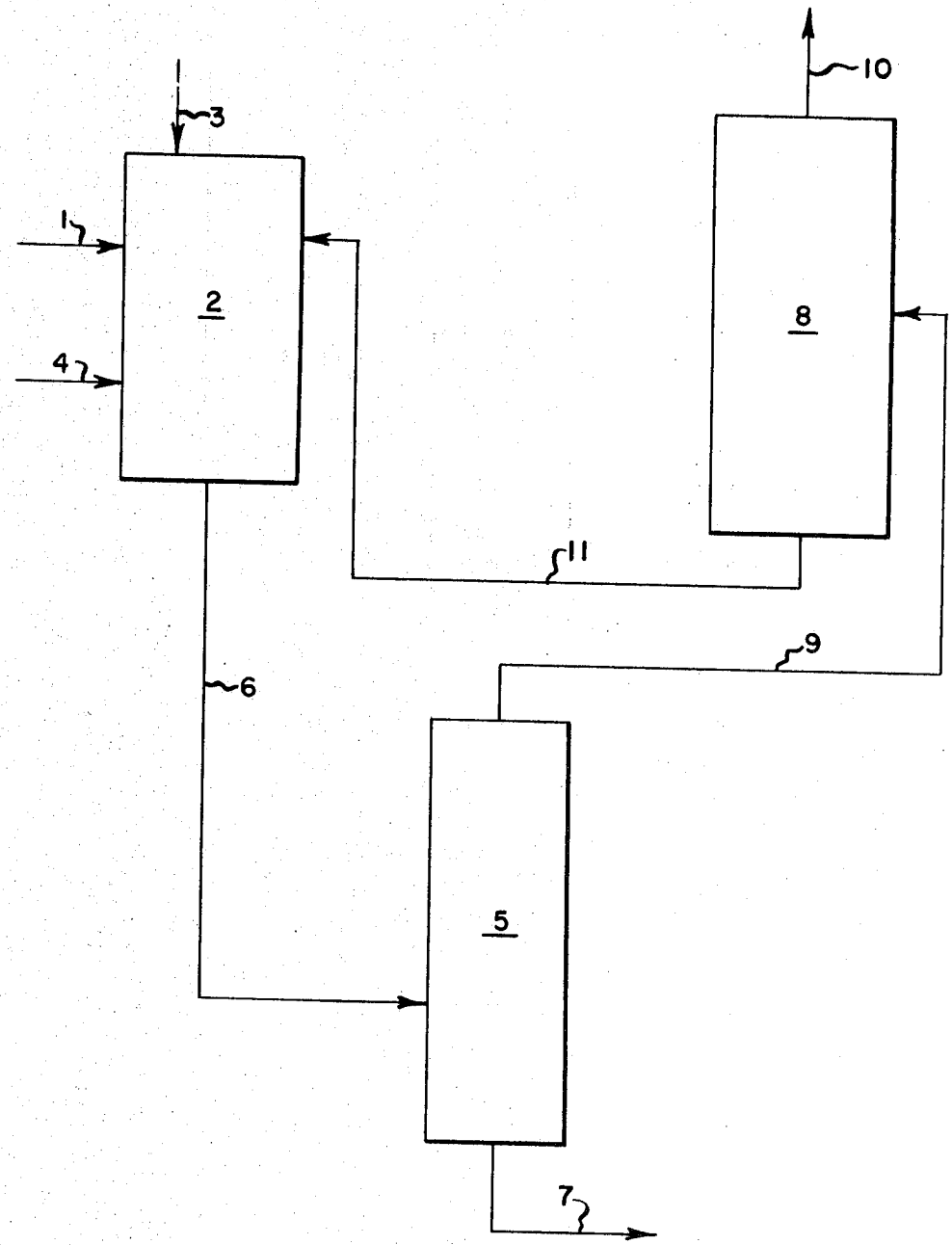

3,564,040
REMOVAL OF TRANS-2-PENTENENITRILE FROM 3- AND 4-PENTENENITRILE
Roland Granville Downing, Chatham, Del., and Roger Allen Fouty, Vienna, W. Va., assignors to E. I. du Pont de Nemours and Company, Wilmington, Del., a corporation of Delaware
Filed June 14, 1968, Ser. No. 737,069
Int. Cl. C07c *121/26*
U.S. Cl. 260—465.8    9 Claims

ABSTRACT OF THE DISCLOSURE

Removal of trans-2-pentenenitrile from a mixture of cis- and trans-3-pentenenitrile and 4-pentenenitrile by the catalytic isomerization of the trans-2-pentenenitrile to cis-2-pentenenitrile followed by fractional distillation of the solution of isomers to remove the cis-2-pentenenitrile. The catalysts used have the structure Ni[M(Z)$_3$]$_4$ where M is P, As or Sb and Z is R or OR wherein R is an alkyl group or an aryl group of up to 18 carbon atoms.

BACKGROUND OF THE INVENTION

The present invention relates to an improvement in the process of hydrocyanating 3-pentenenitrile or 4-pentenenitrile to form adiponitrile, involving the removal of undesirable by-products. This process of hydrocyanating 3-pentenenitrile or 4-pentenenitrile to form adiponitrile is described in British Pat. No. 1,104,140, published Feb. 21, 1968, Belgian Pat. No. 700,420, and U.S. patent applications Ser. No. 679,608, filed Nov. 1, 1967 abandoned in favor of continuation-in-part application Ser. No. 858,098, filed Sept. 15, 1969, and Ser. No. 680,969, filed Nov. 6, 1967 abandoned in favor of continuation-in-part application Ser. No. 771,313, filed on Oct. 28, 1968.

The concern of this invention is the removal of the undesirable by-product trans-2-pentenenitrile from a mixture of cis- and trans-3-pentenenitrile by means of the catalytic isomerization of the trans-2-pentenenitrile to cis-2-pentenenitrile followed by a fractional distillation of the solution of isomers to remove the cis-2-pentenenitrile.

The trans-2-pentenenitrile cannot economically be separated from a mixture of 3-pentenenitrile and 4-pentenenitrile by distillation because the relative volatility of trans-2-pentenenitrile in relation to trans-3-pentenenitrile is only 1.018±0.004. The main component in the mixture of pentenenitriles produces by the hydrocyanation of buradiene is generally trans-3-pentenenitrile. A suitable process for the production of 3-pentenenitriles is more fully described in British Pat. No. 1,104,140.

In the process of hydrocyanating 3- or 4-pentenenitrile to adiponitrile using catalysts such as Ni[P(OC$_6$H$_5$)$_3$]$_4$, such as described in Belgian Pat. No. 700,420, the presence of cis- or trans-2-pentenenitrile even in low concentrations has been found to be detrimental to catalyst efficiency. For purposes of the present invention catalyst efficiency is defined as the moles of adiponitrile produced per mole of nickel complex (catalyst) charged to the reactor. Concomitant with the hydrocyanation of 3- and 4-pentenenitriles some isomerization of 3-pentenenitriles to cis- and trans-2-pentenenitrile occurs. The production of these 2-pentenenitriles is undesirable since they constitute a yield loss as well as a poison for the catalyst. When this hydrocyanation process is run so only a fraction of the 3- and 4-pentenenitriles are converted to products and the reaction product is distilled so that the unreacted 3- and 4-pentenenitriles are recovered and recycled to the hydrocyanation reactor the recovered 3- and 4-pentenenitriles will contain the 2-pentenenitriles produced during, but incidental to, the desired hydrocyanation. The cis-2-pentenenitrile may be separated from the main 3- and 4-pentenenitriles stream by further fractional distillation, but the trans-2-pentenenitrile isomer remains with the 3- or 4-pentenenitriles.

SUMMARY OF THE INVENTION

It has now been found that when trans-2-pentenenitrile is fed along with the 3- and 4-pentenenitriles to the hydrocyanation reactor it is isomerized to cis-2-pentenenitrile under the influence of nickel (O) tetrakis triaryl phosphite catalysts. Consequently, in a continuous process a steady state of concentration can be maintained at a low level by first isomerizing the trans-2-pentenenitrile to cis-2-pentenenitrile at a rate equal to the rate of production of trans-2-pentenenitrile from the 3-pentenenitriles, and, second, removing cis-2-pentenenitrile by fractional distillation at a rate equal to the production of cis- and trans-2-pentenenitrile from the 3- and 4-pentenenitriles stream. Thus, generally the steady state concentration of 2-pentenenitriles in such a reaction mixture can be maintained below 5 mole percent as based on the nitriles present in the reaction mixture. For this purpose nitriles present include the unreacted pentenenitriles present in the reactor as well as the dinitriles present in the reactor.

The flow streams involved in the present invention are further illustrated by the attached drawing in which a stream 1 (consisting principally of cis-3-pentenenitrile, trans - 3 - pentenenitrile, and 4-pentenenitrile along with trace amounts of various mono and dinitriles when the stream is obtained by the hydrocyanation of butadiene) is fed into a reactor 2 along with a stream 3 of hydrogen cyanide and a stream 4 of catalyst. The liquid reaction mixture in reactor 2 consists essentially of cis-2-pentenenitrile, trans - 2 - pentenenitrile, cis-3-pentenenitrile, trans - 3 - pentenenitrile, 4-pentenenitrile, adiponitrile, methylglutaronitrile, ethylsuccinonitrile, cis-2-methyl - 2 - butenenitrile, trans-2-methyl - 2 - butenenitrile, and the catalyst system which, for example, may be nickel (O) tetrakis triphenyl phosphite, additional triphenyl phosphite and a promoter such as zinc chloride. This liquid phase is then continuously fed to distillation column 5 as stream 6. The fraction of stream 6 containing the catalyst components and dinitriles is then removed as stream 7. The adiponitrile product and the remaining dinitriles are then separated. The unspent catalyst may be recycled to reactor 2. If desired, an extractor (not shown) may be installed in stream 6 to remove catalyst by solvent extraction. The remaining pentenenitriles which consist of cis-2-pentenenitrile, trans - 2 - pentenenitrile, cis - 3 - pentenenitrile, trans - 3 - pentenenitrile, 4-pentenenitrile, cis - 2 - methyl - 2 - butenenitrile, and trans-2-methyl-2-butenenitrile are fed to distillation column 8 as stream 9. Cis-2-pentenenitrile along with the cis-2-methyl-2-butenenitrile and trans - 2 - methyl-2-butenenitrile is removed as stream 10 from the remaining pentenenitriles which are then recycled to reactor 2 as stream 11.

The catalyst system used to hydrocyanate the 3-pentenenitriles to adiponitrile also serves to isomerize the trans-2-pentenenitrile to cis-2-pentenenitrile.

Generally, the catalysts are nickel, palladium, or cobalt complexes which may be preformed or prepared in situ and include nickel or palladium compounds containing ligands such as carbon monoxide, phosphines, arsine, stibines, phosphites, arsenites, stibites, and mixtures thereof.

Suitable cobalt catalysts are formed from a mixture of a compound of the formula CoX$_2$ wherein X is a halide, and a compound of the structure HCo(MZ₃)₄ wherein M and Z have the meanings defined below.

A preferred class of catalysts are nickel or palladium complexes of alkyl or aryl (containing up to 18 carbon atoms), phosphites, arsenites, stibites, phosphines, arsines, or stibines.

These complexes have the general structure

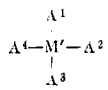

where M' is Ni or Pd, $A^1$, $A^2$, $A^3$, and $A^4$ are neutral ligands which may be the same or different and have the formula $M(Z)_3$ wherein M is selected from the class consisting of P, As and Sb and wherein Z is selected from the class consisting of R and OR wherein R is an alkyl group or an aryl group containing up to 18 carbon atoms wherein the three R's may be the same or different. If desired, any one of the R's may be cojoined where possible. It is believed that in these complexes at least some of the nickel or palladium is present in the zero valent state. The preferred neutral ligands of this group are the triaryl phosphites such as triphenyl phosphite, tris-(p-chlorophenyl) phosphite, tris-(p-methoxyphenyl) phosphite, and tris(m&p-cresyl)phosphite. The nickel compounds are preferred.

Satisfactory techniques for preparing these nickel tetrakis comounds may be found in U.S. Pat. No. 3,328,443, issued June 27, 1967 to Reginald F. Clark and Charles D. Storrs. The palladium compounds are prepared by the same techniques.

In many instances, it is advantageous to have an excess of certain neutral ligands present with respect to the nickel complex. The preferred excess ligands are the triaryl phosphites wherein the aryl groups contain up to 18 carbon atoms. Generally, when used, the excess ligand is present in at least a two molar excess as based on the moles of nickel present. Generally, there is no advantage to be obtained in using over a 300 mole excess of ligand as based on one mole of nickel, since the rate becomes too slow to be practical due to the small amount of nickel present. The preferred triaryl phosphites for use as excess ligand are triphenyl phosphite, tri-(p-methoxyhenyl)phosphite, and tris-(m&p-cresyl)phoshite, This use of excess ligand operates to extend catalyst life. This ligand used may be the same as or different from the ligand attached to nickel in the nickel complex.

If desired, a promoter may be used in conjunction with the nickel complex. The promoter generally is a boron compound or a cationic form of a metal selected from the class consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron, and cobalt. The preferred boron compounds are borohydrides and organoboron compounds of the structure $B(R')_3$. The borohydrides are the alkali metal borohydrides and the tetra (lower alkyl) ammonium borohydrides. The preferred borohydrides are sodium borohydride, potassium borohydride and borohydrides of the formula $B_nH_{n+4}$ where $n$ is an integer of from 2 to 6 and borohydrides of the formula $B_mH_{m+6}$ where $m$ is an integer of from 4 to 10. When the boron compounds have the structure $B(R')_3$, R' is selected from the class consisting of H, aryl radicals of from 6 to 18 carbon atoms, lower alkyl radicals of from 1 to 7 carbon atoms, and lower alkyl radicals of from 1 to 7 carbon atoms substituted with a cyano radical. Generally, the case where R' is phenyl or phenyl substituted with an electronegative radical is preferred.

The preferred members of this class of R' have the structure

wherein —Q is selected from the class consisting of —H, —F and CF₃. Other suitable promoters are normally salts of the metals listed above and include aluminum chloride, zinc chloride, cadmium iodide, titanium trichloride, titanium tetrachloride, zinc acetate, ethyl aluminum dichloride, ethylaluminum sesquichloride, chromic chloride and zinc iodide. A very large number of compounds are suitable for use as promoters. The promoter acts to improve the catalyst efficiency. The amount of promoter used may be varied from a 1:16 to 16:1 molar ratio of promoter to catalyst, such as the nickel or palladium compound.

The isomerization of trans-2-pentenenitrile may be carried out either in a stirred continuous or a stirred batch operation. Generally, a continuous operation such as set forth above in the description of the drawing is preferred. The molar ratio of trans-3-pentenenitrile to nickel catalyst generally is varied from about 10:1 to about 2000:1.

The exact temperature which is preferred is dependent to a certain extent on the particular catalyst being used and the desired rate. Generally, temperatures of from —25 to 300° C. can be used with from 0 to 150° C. being preferred.

Atmospheric pressure is satisfactory for carrying out the isomerization of the present invention and, hence, pressures of from about 0.7 to 10 atmospheres are preferred due to the obvious economic considerations although pressures of from 0.3 to 100 atmospheres can be used if desired.

The adiponitrile formed by the present invention is an intermediate used in the production of hexamethylene diamine which is used in the production of polyhexamethylene adipamide, a commercial polyamide used to produce textile fibers, films and molded articles.

DESCRIPTION OF THE PREFERRED EMBODIMENTS

These examples illustrate the deleterious effect of 2-pentenenitriles on the catalyst efficiency in the process for the formation of dinitriles from 3-pentenenitriles and 4-pentenenitrile.

The reactions are performed in a continuous stirred tank type reactor which is fitted with a stirrer, with suitable ports in the top for introduction of the feed stream, and with a jacket surrounding the reactor through which a heat transfer fluid is circulated in order to maintain a set temperature in the reactor. The reactor has an exit port extending from its side which acts as an overflow and limits the liquid phase volume of the reactor to about 45 ml. The reactor ssytem which is closed to the atmosphere is flushed initially with dry N₂, and a continuous slow flow of N₂ is maintained into the reactor, out the exit port, through a cold condenser and finally bubbled through a liquid seal of paraffin oil to the atmosphere. The reactants are introduced continuously at a constant rate which is set for each experiment. The catalyst components are fed as a solution in the pentenenitriles and the HCN is fed as a vapor solution in nitrogen. Each experiment is run until a steady state is reached in the reactor before samples are taken for analysis. The product from the reactor overflows continuously into a receiver where it is held for periodic removal.

The reagents are metered into the reactor by precision syringe pumps. The HCN is metered as a liquid by a specially cooled syringe pump into a small heated chamber where it is evaporated and diluted with dry nitrogen. The gaseous mixture of HCN in nitrogen is then fed to the vapor space above the reaction mixture. The agitation is vigorous enough to allow for adequate contact of the gas and liquid phases in the reactor.

EXAMPLE I

The reactor is continuously fed with a mixture of pentenenitriles containing 0 percent dinitriles, 99.8 percent 3-pentenenitriles and 4-pentenenitrile, 0.15 percent trans-2-pentenenitrile and 0 percent cis-2-pentenenitrile. To this mixture of pentenenitriles are added the components of a standard catalyst system in the ratio of 1 mole of

to 2 moles of ZnCl$_2$, to 12 moles of

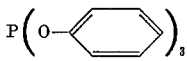

The ratio of pentenenitriles to nickel in the feed mixture is 354:1 (total moles of pentenenitriles per mole of Ni). The feed mixture is fed into the reactor and subsequently overflows therefrom at a rate such that the average residence time of the reaction mixture in the reactor is 90 minutes.

The resulting feed rate for the pentenenitriles is 4.54 mmoles per minute and that for HCN is set nominally to convert 40% of the pentenenitriles to dinitriles. The temperature of the reactor is controlled at 60° C. After 4.5 hours, steady state reaction conditions are reached.

Gas chromatographic analysis of the effluent liquid indicates the presence of 26.8 mole percent adiponitrile, 5.73 mole percent other dinitriles, 66.6 mole percent 3-pentenenitriles and 4-pentenenitrile, 0.47 mole percent trans-2-pentenenitrile, and 0.44 mole percent cis-2-pentenenitriles. The mole percent calculations are based on the total moles of mononitriles and dinitriles present. This indicates that of the pentenenitriles charged 33 percent are converted to dinitriles and that, of the dinitriles produced, 80 percent are adiponitrile and that the number of cycles (ratio of moles of adiponitrile produced to moles of nickel charged) is 95. In order to evaluate the amount of active catalyst remaining in the steady state composition, an aliquot is tested by hydrocyanating it semi-batchwise until all the catalyst has been deactivated and noting the increase in the dinitriles formed. This test is performed in the above apparatus at the same temperature after conclusion of the continuous reaction. The aliquot is placed in the reactor and HCN is fed in the manner noted above. No pentenenitrile or catalyst is fed. The product is analyzed as before and found to contain enough additional adiponitrile to give an overall catalyst efficiency of 231 cycles.

EXAMPLE II

Example I is repeated except the mixture of pentenenitriles charged contains 90.1 percent 3-pentenitriles and 4-pentenenitrile, 8.85 percent trans-2-pentenenitrile, and and 0.18 percent cis-2-pentenenitrile. The steady state effluent from the reactor contains 31.7 mole percent adiponitrile, 6.76 mole percent other dinitriles, 51.8 mole percent 3-pentenenitriles and 4-pentenenitrile, 7.10 mole percent trans-2-pentenenitrile and 2.40 mole percent cis-2-pentenenitrile. This indicates that of the pentenenitriles charged 39 percent are converted to dinitriles and that of the dinitriles produced 81 percent are adiponitrile and that the number of cycles is 111. When the effluent is tested for unused active catalyst by means of the semi-batch reaction until the catalyst is spent, a total of only 150 cycles is obtained. Comparing this result to that obtained in Example I the presence of 2-pentenenitriles at the 9.5 percent level versus the 0.91 percent level causes a substantial overall lowering of catalyst efficiency (from 231 to 150).

This example also demonstrates the isomerization of trans-2-pentenenitrile to cis-2-pentenenitrile.

EXAMPLE III

Example I is repeated except the temperature of the reactor is 50° C., the residence time is 120 minutes, an equal molar amount of

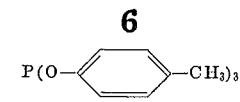

is substituted for the

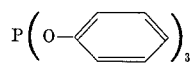

used in the catalyst system in Example I, the pentenenitriles mixture charged to the reactor contains 98.8 percent 3-pentenenitriles and 4-pentenenitrile, 0.20 percent trans-2-pentenenitrile and 0 percent cis-2-pentenenitrile; and the molar ratio of pentenenitriles to catalyst (as based on Ni) in the feed stream is 1,000.

The resulting feed rate for the pentenenitriles is 3.69 mmoles per minute and that for the HCN is set nominally to convert 30 percent of the pentenenitriles to dinitriles. After 10 hours, the reactor effluent has attained steady state composition. The steady state effluent from the reactor contains 18.8 mole percent adiponitrile, 4.31 mole percent other dinitriles, 76.0 mole percent 3-pentenenitriles and 4-pentenenitrile, 0.46 mole percent trans-2-pentenenitrile and 0.32 mole percent cis-2-pentenenitrile. This indicates that of the pentenenitriles charged 24 percent are converted to dinitriles and that of the dinitriles produced 79 percent are adiponitrile and that the number of cycles is 188. An aliquot of the effluent is tested for unused active catalyst as described in Example I. An overall catalyst efficiency of 390 cycles is obtained.

EXAMPLE IV

Example III is repeated except that the pentenenitriles fed to the reactor contain 97.43 percent 3-pentenenitriles and 4-pentenenitrile, 2.57 percent trans-2-pentenenitrile, and 0 percent cis-2-pentenenitrile. The steady state effluent from the reactor contains 20.6 mole percent adiponitrile, 4.59 mole percent other dinitriles, 71.5 mole percent 3-pentenenitriles and 4-pentenenitrile, 2.47 mole percent trans-2-pentenenitrile, and 0.70 mole percent cis-2-pentenenitrile. This indicates that of the pentenenitriles charged 26 percent are converted to dinitriles, and that of the dinitriles produced 79 percent are adiponitrile and that the number of cycles is 206. The test for unused active catalyst gave 336 cycles, overall. Comparing this result to that obtained in Example III, the presence of 2-pentenenitriles at the 3.31 percent level versus the 0.78 percent level causes a small lowering of the catalyst efficiency (from 390 to 336 cycles).

Examples I and III above feed pentenenitriles to the reactor which are low in 2-pentenenitriles and have an isomer distribution similar to that normally formed in the 3-pentenenitrile feed produced by the process of hydrocyanation of butadiene.

Examples I and III illustrate how the 2-pentenenitriles build up during the hydrocyanation of 3-pentenenitrile to adiponitrile. When Examples I and III are compared with Examples II and IV respectively the deleterious effect of higher 2-pentenenitriles concentration on the catalyst efficiency is shown. Consequently, in any process in which the 3-pentenenitrile is only partially converted to dinitriles (such as illustrated in the examples) and the unreacted 3-pentenenitriles is recycled to the reactor, the catalyst efficiency will be reduced owing to the 2-pentenenitriles introduced in the recycle feed. However, the concentration of 2-pentenenitriles may be controlled at the low level by the practice of the invention. Example IV illustrates for a continuous process a set of conditions in which the rate of isomerization of trans-2-pentenenitrile to cis-2-pentenenitrile is equal to the rate of production of trans-2-pentenenitriles. Removal of the cis-2-pentenenitriles by distillation of the recycle pentenenitriles will result in control of the concentration of the 2-pentenenitriles in the process of a low level and with a minimum penalty in catalyst efficiency.

We claim:
1. In a continuous process for the production of adiponitrile by catalytic addition of hydrogen cyanide to 3-pentenenitrile and 4-pentenenitrile, which pentenenitriles contain trans-2-pentenenitrile, the steps of (a) isomerizing in a reactor trans-2-pentenenitrile to cis-2-pentenenitrile while simultaneously hydrocyanating 3-pentenenitrile and 4-pentenenitrile both the isomerization and hydrocyanation being simultaneously performed by contacting the trans-2-pentenenitrile, 3-pentenenitrile and 4-pentenenitrile with a catalyst consisting essentially of a complex of a metal of the group consisting of nickel, palladium and cobalt at a temperature in the range of $-25$ to $300°$ C. and under a pressure of from 0.3 to 300 atmospheres, (b) fractionally distilling the thus formed mixture to remove cis-2-pentenenitrile followed by (c) returning the remaining mixture of the aforesaid pentenenitriles to the said reactor for further hydrocyanation of 3-pentenenitrile and 4-pentenenitrile to adiponitrile and further isomerization of trans-2-pentenenitrile to cis-2-pentenenitrile.

2. The process of claim 1 wherein the catalyst is a compound of the formula

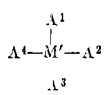

wherein M' is selected from the class consisting of Ni and Pd, and $A^1$, and $A^2$, $A^3$ and $A^4$ are neutral ligands having the formula $PZ_3$
wherein Z is selected from the class consisting of R and OR, wherein R is selected from the class consisting of alkyl and aryl hydrocarbyl radicals containing up to 18 carbon atoms.

3. The process of claim 2 wherein the temperature is maintained in the range from 0 to 150° C.

4. The process of claim 2 wherein the process is operated in a continuous manner by isomerizing the trans-2-pentenenitrile to cis-2-pentenenitrile at a rate equal to the rate of production of trans-2-pentenenitrile from 3-pentenenitrile and by removing cis-2-pentenenitrile by fractional distillation at a rate equal to the production of cis and trans-2-pentenenitriles from the 3-pentenenitrile and 4-pentenenitrile.

5. The process of claim 4 wherein M' is nickel.
6. The process of claim 5 wherein the Z's are OR.
7. The process of claim 6 wherein R is aryl.
8. The process of claim 2 wherein there is present in addition to the compound of formula M' ($A^1$, $A^2$, $A^3$, $A^4$) a compound of the formula $PZ_3$ wherein Z is defined as in claim 2, the molar excess of $PZ_3$ to M' ($A^1$, $A^2$, $A^3$, $A^4$) being at least 2.

9. The process of claim 2 wherein there is present in addition to the compound of formula M' ($A^1$, $A^2$, $A^3$, $A^4$) as a promoter a cation of a metal selected from the group consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt.

References Cited
UNITED STATES PATENTS
3,459,785   8/1969   Jones _____ 260—465.8

JOSEPH P. BRUST, Primary Examiner

U.S. Cl. X.R.
260—465.3, 465.9

PO-1050
(5/69)

UNITED STATES PATENT OFFICE
CERTIFICATE OF CORRECTION

Patent No. 3,564,040  Dated November 8, 1971

Inventor(s) ROLAND GRANVILLE DOWNING & ROGER ALLEN FOUTY

It is certified that error appears in the above-identified patent and that said Letters Patent are hereby corrected as shown below:

Column 7, line 14, ". . . 300 atmospheres"

should read "100 atmospheres . . ."

Signed and sealed this 21st day of March 1972.

(SEAL)
Attest:

EDWARD M. FLETCHER, JR.　　　　　　　　ROBERT GOTTSCHALK
Attesting Officer　　　　　　　　　　　　Commissioner of Patents